United States Patent [19]

König

[11] 3,879,943
[45] Apr. 29, 1975

[54] APPARATUS FOR EXHAUST GAS PURIFICATION THROUGH EXHAUST GAS CONVERSION AND EXHAUST GAS RECYCLING

[75] Inventor: Axel König, Wolfsburg, Germany

[73] Assignee: Volkswagenwerk Aktiengesellschaft, Wolfsburg, Germany

[22] Filed: July 18, 1973

[21] Appl. No.: 380,138

[30] Foreign Application Priority Data
July 20, 1972 Germany............................ 2235568

[52] U.S. Cl..................... 60/278; 60/299; 23/288 F
[51] Int. Cl............................................... F01n 3/10
[58] Field of Search............. 60/278, 279, 299–302; 23/288 F

[56] References Cited
UNITED STATES PATENTS
3,587,541  6/1971  Sarto............................ 123/119 A
3,768,982  10/1973  Kitzner et al..................... 23/288 F Primary Examiner—C. J. Husar
Assistant Examiner—Robert E. Garrett
Attorney, Agent, or Firm—Brumbaugh, Graves, Donohue & Raymond

[57] ABSTRACT

Apparatus for reducing, by catalytic conversion, the concentration of noxious components in the exhaust gases of an internal combustion engine. The apparatus includes a means for removing a portion of the exhaust gases upstream of the catalytic converter for recycling to the combustion chamber of the internal combustion engine. This removal of a portion of the exhaust gases changes the internal air stream characteristics of the catalytic converter, resulting in more efficient operation. Also, recycling of a portion of the exhaust gases serves to lower the combustion chamber temperature of the internal combustion engine, thus reducing the emission of nitrous oxides.

4 Claims, 2 Drawing Figures

3,879,943

APPARATUS FOR EXHAUST GAS PURIFICATION THROUGH EXHAUST GAS CONVERSION AND EXHAUST GAS RECYCLING

BACKGROUND OF THE INVENTION

This invention relates in general to apparatus for exhaust gas purification through catalytic conversion and exhaust gas recycling, and particularly concerns an exhaust gas purification apparatus for internal combustion engines having a catalytic converter which is arranged in a cross sectional enlargement of an exhaust gas conduit system and provided with a means for return of part of the unpurified exhaust gas into the main combustion chamber of the internal combustion engine.

As is well known, worldwide attempts to maintain clean air currently include extensive efforts to remove the noxious components contained in exhaust gases, especially the exhaust gases of internal combustion engines. These noxious components consist essentially of carbon monoxide, uncombusted hydrocarbons and nitrous oxides. For removal of carbon monoxide and uncombusted hydrocarbons, thermal and catalytic afterburning plants have been developed. The nitrous oxides, too, can be removed in a catalytic aftertreatment installation. However, in addition to these possibilities, reduction of nitrous oxide emissions also can be achieved by recycling a portion of the exhaust gases through the combustion chamber. By such returning of part of the exhaust gases, consisting essentially of inert gases, the peak combustion temperatures are reduced in the main combustion chamber of the internal combustion engine to such an extent that the emission of nitrous oxides is decisively reduced. Up to 15% of the total emitted exhaust gas may be used. This portion of exhaust gas is tapped off the exhaust gas channel.

Catalytic converters used for reducing the quantity of noxious components present in exhaust gases generally consist of a carrier material which is coated with a catalytic material which effects the chemical transformation of the noxious gas components. The carrier material may be a loose material or a solid body (monolith) with channels passing through it. In a loose-material catalyst, the exhaust gas carrying the noxious gas components passes between the individual loose particles coated with the catalytic material, whereas in a monolith catalyst, the exhaust gas flows through the channels arranged in the carrier body. Passage of the exhaust gases through such catalytic converters is always associated with a loss in pressure which in turn reduces the thermodynamic effectiveness of the internal combustion engine. In order to keep that pressure loss as low as possible, the cross section of the catalytic converter is generally dimensioned so as to be substantially larger than the cross section of the conduits delivering and removing the exhaust gases to and from the catalytic converter. Accordingly, the connection of the conduits to the housing enclosing the coated carrier material is formed by funnel-shaped connecting pieces at the upstream and downstream ends of the housing. The exhaust gas delivery and discharge lines, the housing accommodating the coated carrier material and the funnel-shaped connecting pieces may have any desired cross section shape. However, as a rule, their cross sections are circular.

When exhaust gas flows through a catalytic converter of this kind, a reduction in the flow velocity of the exhaust gas occurs due to the increased cross sectional area of the housing as compared to the exhaust gas delivery conduit which has a comparatively small diameter. Accordingly, in the diffuser-like funnel-shaped portion of the exhaust gas conduit, an increase in pressure in the direction of flow and a danger of separation of the flow from the inside conduit wall occurs. A torus-shaped eddy then is created in this funnel-shaped transition piece which leads to non-uniform velocity distribution at the entrance to the catalytic converter. Thereby, the flow velocity of the exhaust gas is greatest in the center core of the catalyst and is appreciably reduced in the zone of the catalyst which lies outside the projected cross sectional area of the delivery conduit. This velocity distribution has an especially harmful effect in monolithic catalytic converters as the channels in such catalytic converters are not connected with one another so that the abovedescribed, center core, exhaust gas velocity profile is maintained over the entire length of the catalytic converter.

Inasmuch as the velocity of the exhaust gas in the center core of the catalytic converter is substantially higher than in the edge regions, a significantly larger exhaust gas quantity and thereby a significantly larger quantity of noxious components flows through the center core as opposed to the surrounding catalytic material. Thus, the border regions of the catalytic material are far from fully utilized for chemical conversion. This has a negative effect on the overall efficiency of the catalytic converter. Moreover, the conversion of the noxious substances carried in the exhaust gas into harmless gas components is exothermic. Thus, the heat released, and thereby the thermal stress on the catalytic material is many times higher in the center core than in the surrounding edge region. At times, this heat stress may become so large that the catalytic material in the center core burns, and is destroyed. As it is this center core which carries the main load of conversion of noxious components, such burning may result in a decisive impairment of the effectiveness of the entire catalytic converter. Hence, a catalytic converter of improved design is needed.

SUMMARY OF THE INVENTION

It is accordingly an object of the present invention to provide apparatus for the catalytic conversion of the noxious components present in the exhaust gases emitted from an internal combustion engine in which the effectiveness of exhaust gas purification is substantially improved by simple means and which renders a desirable exhaust gas purifying effect at reduced structural cost.

This object, as well as other objects which will become apparent in the discussion that follows, is achieved, according to the present invention, by providing means for better utilization of the catalyst surface by delivery with improved uniformity of velocity, especially in monolithic catalytic converters, and thereby, the danger of local overheating of the catalyst is reduced. This means includes a tapping point, for exhaust gas return, arranged in the zone of the funnel-shaped enlargement (diffuser portion) of the exhaust gas-conveying channel.

In a further development of the invention, passage openings are provided in the wall of the diffuser portion of the exhaust gas channel which, by means of a common conduit, are connected with a lower-pressure chamber placed before the main combustion chamber of the internal combustion engine. As a result of this development, the quantity of exhaust gas required for recycling is removed by drawing off in the zone of the diffuser portion of the exhaust gas channel. Separation of the flow from the inside wall of the diffuser portion is effectively prevented at the same time as the flow applies itself to the wall due to boundary layer control so that the velocity across the cross section remains essentially constant. This uniformization of the velocity profile of the gaseous flow provides for a uniform utilization of the entire surface of the catalytic material for purposes of chemical conversion. As a result, the overall length of the catalytic converter can be substantially reduced and still be as effective as a longer, more expensive catalytic converter. At the same time, the more uniform application to the catalyst surface improves the uniformity of the thermal stress so that the risk of local overheating of the catalyst center core is reduced.

It is a feature of the invention that the drawing off of the flow boundary layer in the diffuser also brings about a reduction in pressure loss and thereby an improvement in the total efficiency of the combustion process of the internal combustion engine. Suitably, the passage openings for the drawing off of the boundary layer are uniformly distributed over the circumference of the diffuser shell.

The device in accordance with the invention has been found to be especially advantageous in monolith-type catalytic converters.

BRIEF DESCRIPTION OF THE DRAWINGS

For a better understanding of the invention, reference may be made to the following description of an exemplary embodiment thereof taken in conjunction with FIGS. 1 and 2 of the accompanying drawings in which one embodiment of the invention is represented

DESCRIPTION OF AN EXEMPLARY EMBODIMENT

Figure 1:
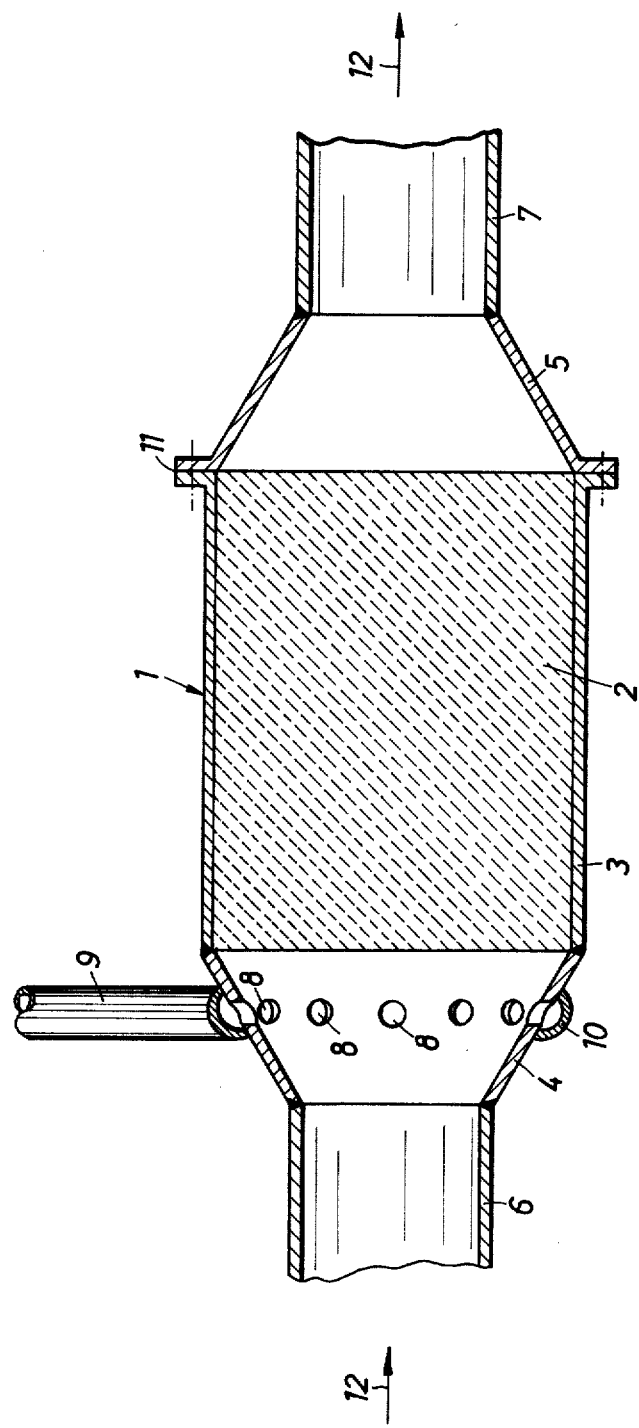
FIG. 1 is a longitudinal section through an exhaust gas conduit system with a monolithic catalyst arranged in an enlargement of the system.

Catalytic converter 1 is provided with a monolithic carrier body 2 which is arranged in a cylindrical housing 3 and is furnished with axial channels extending over the entire length for passage of the exhaust gas flow. The surface, accessible to the exhaust gas, of the carrier body 2 is covered with a catalytic mass, such as a precious metal mass, which by means of catalytic reaction effects the conversion of the noxious components of the exhaust gas. Cylindrical housing 3 is part of an exhaust gas conduit system which also contains a pipe 6 for the delivery and a pipe 7 for the removal of the exhaust gas as well as funnel-shaped transition elements 4 and 5 for continuous enlargement of the cross section of the exhaust gas conduit from the cross sections of the pipes 6 and 7 to the larger cross section of the housing element 3.

Following the direction of flow of the exhaust gas through the catalyst 1, indicated by the arrows 12, the transition element 4 constitutes a diffuser from which part of the exhaust gas is removed for purposes of returning it to the main combustion chamber. This removal is obtained through drawing off of the boundary flow in the diffuser 4 by means of passage openings 8, which are connected with one another by means of a ring conduit 10. A common conduit 9 leads to a space preceding the main combustion chamber (not shown) which has a lower pressure than the diffuser. In internal combustion engines, the latter space preferably consists of an intake pipe or pipes in which the returned exhaust gas is mixed with the fuel-air mixture for combustion.

As previously explained, mixing exhaust gas with the fuel-air mixture for combustion results in a reduction of the peak temperatures of engine combustion so that the output of nitrous oxides in the exhaust gas is decisively diminished.

The drawing off of the exhaust gas in the diffuser element 4 of the exhaust gas conduit system brings about the aforedescribed improved uniformity of the velocity profile of the gas flow on entrance into the monolithic carrier body 2 and, thereby, a uniform utilization of the total catalyst surface and a diminishing of the danger of local overheating of the catalytic material. Towards such end, the perforations 8 are distributed uniformly over the circumference and may consist of bores, slits or the like.

Figure 2:
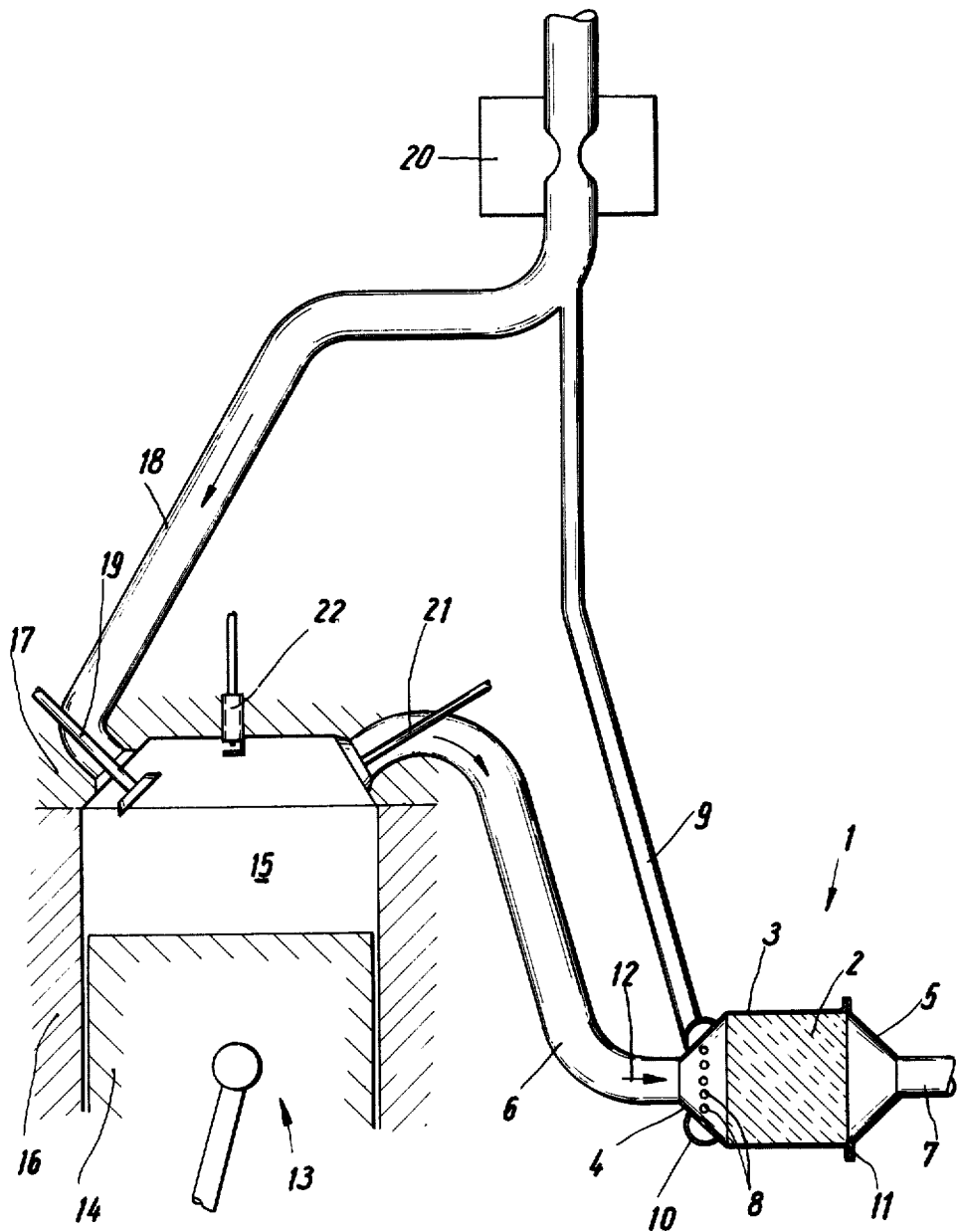
FIG. 2 is a representational diagram of a portion of an internal combustion engine and the embodiment of the invention illustrated in FIG. 1.

FIG. 2 illustrates how the catalytic converter 1 of FIG. 1 may be connected to an internal combustion engine 13 to purify the engine exhaust gases. As shown, the pipe conduit 9, connected with the annular conduit 10, is coupled to the intake pipe 18 of the engine, downstream of the carburetor 20. The underpressure prevailing in the intake pipe 18 causes a sufficiently large quantity of exhaust gases to be drawn through the passage openings 8 in the diffuser 4 of the catalytic converter. If necessary, a suitable valve may be provided in the pipe conduit 9, approximately at the point where it opens into the intake pipe 18, to control the quantity of the returned exhaust gases as a function of the instantaneous operating condition of the engine. The intake pipe 18 supplies the fuel-air-exhaust gas mixture to the combustion chamber 15 of the cylinder 16 via an intake valve 19 arranged in the cylinder head 17. After the fuel-air-exhaust gas mixture has been ignited by a spark plug 22, the resulting gases are exhausted by the piston 14 through an exhaust valve 21 into the exhaust pipe 6. As indicated above, the exhaust pipe 6 is directly connected to the diffuser 4 of the catalytic converter 1. individual Although the example of an embodiment described deals with a circular cross section of the exhaust gas conduit system, it should be clear that other cross sections are possible, e.g., elliptical or square cross sections. The individual components of the exhaust gas conduit system may be joined by flanges 11 or by welding.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. An internal combustion engine with apparatus for reducing, by catalytic conversion, the concentration of noxious components in combustion exhaust gases comprising:
   a. a combustion chamber,
   b. an exhaust gas conduit connected to receive exhaust gases,
   c. an exhaust gas purifier housing connected to said exhaust gas conduit, said housing having a larger cross section than said conduit,
   d. funnel-shaped means arranged upstream of said housing between said housing and said exhaust gas conduit, and providing an interconnection therebetween,
   e. carrier means coated with catalytically active material and arranged in said housing,
   f. port means arranged on said funnel-shaped means near said housing for withdrawing a portion of the exhaust gases at a first pressure upstream of said housing,
   g. inlet means supplying a fluid to said combustion chamber, said inlet means comprising a space at a second pressure lower than said first pressure; and
   h. conduit means communicating said port means and said space, where said portion of the exhaust gases is returned for recombustion in said combustion chamber.

2. Apparatus as in claim 1 wherein said port means provided in said funnel-shaped means is provided with common conduit means for carrying said portion of the exhaust gases to said space at said second pressure.

3. Apparatus as in claim 2 wherein said port means includes a plurality of openings distributed uniformly over the circumference of said funnel-shaped means.

4. Apparatus as in claim 1 wherein said carrier means is monolithic.

* * * * *